Dec. 25, 1945.　　　E. S. GORTON　　　2,391,412
SEPARATOR
Filed Sept. 29, 1942　　　3 Sheets-Sheet 1
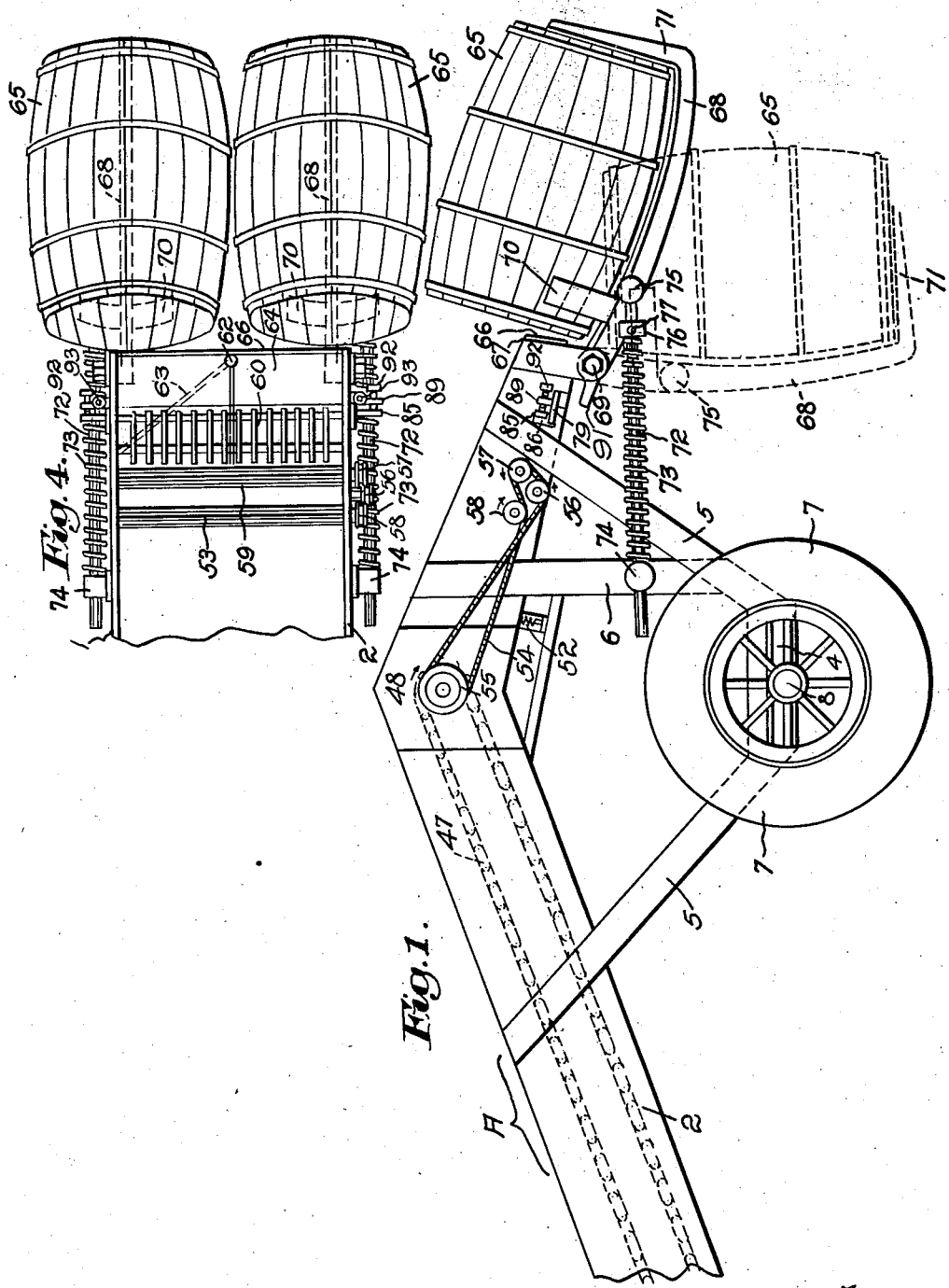

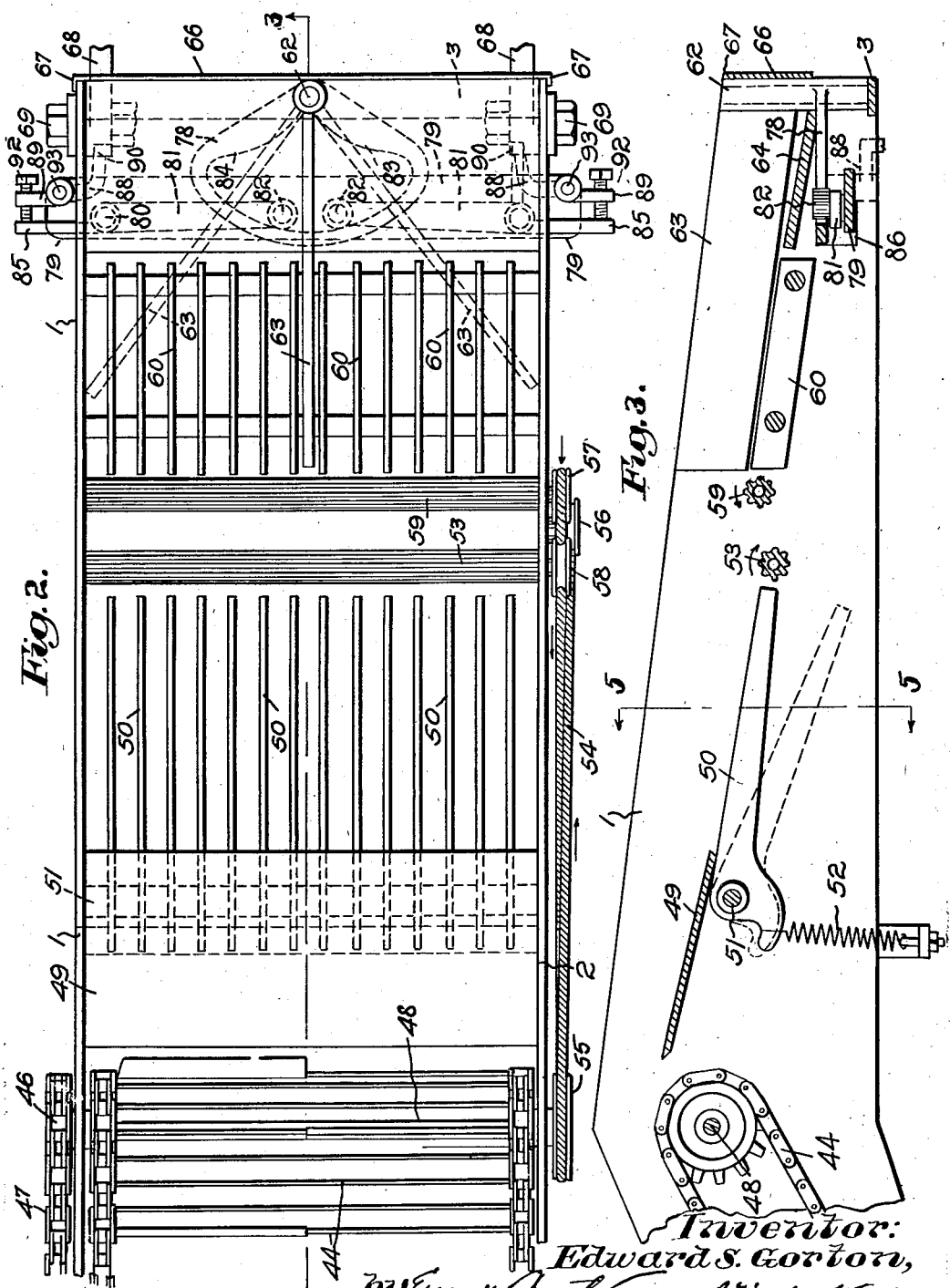

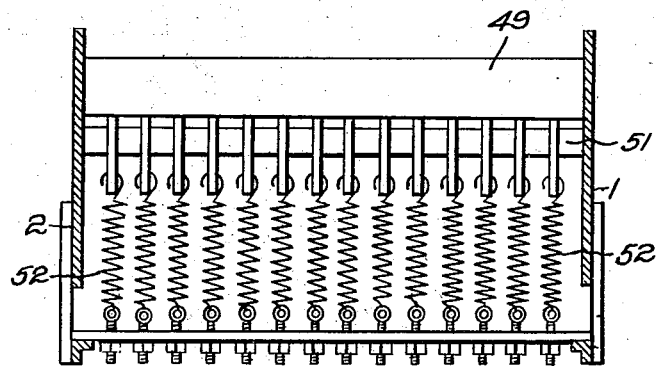
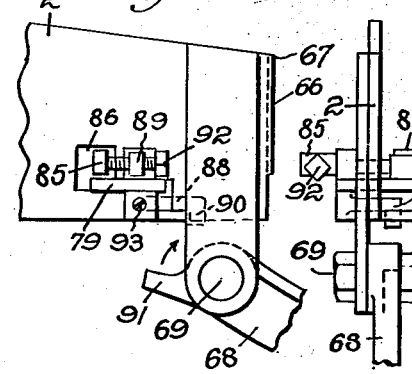
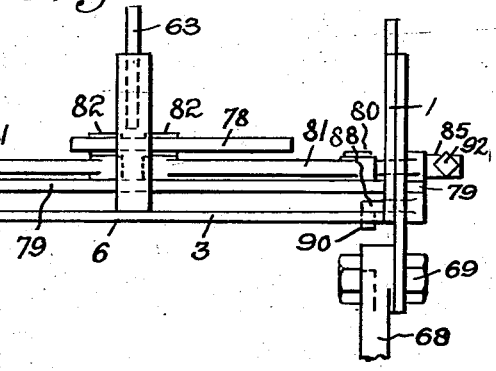
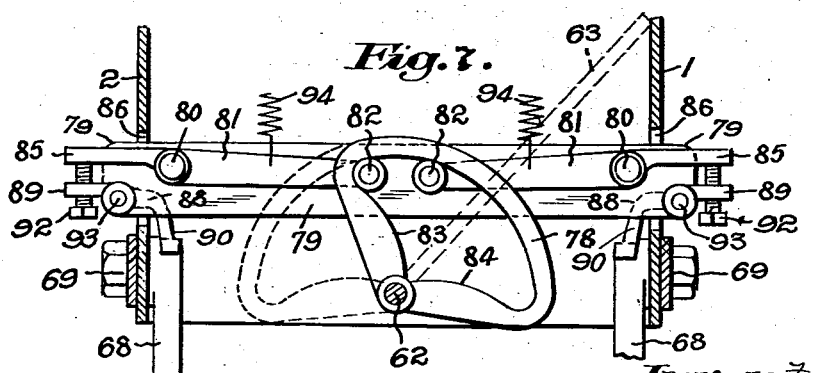

Patented Dec. 25, 1945

2,391,412

UNITED STATES PATENT OFFICE 2,391,412

SEPARATOR

Edward S. Gorton, Waterville, Maine

Application September 29, 1942, Serial No. 460,104

1 Claim. (Cl. 209—75)

This invention aims to provide a novel potato and rock separator for potato harvesters.

In the drawings:

Fig. 1 is a side elevation of the rear portion of the harvester;

Fig. 2, a partial plan of the same;

Fig. 3, a longitudinal, vertical section of the rear portion of the harvester body, without the bagging means, on the line 3—3, Fig. 2, showing the potato and rock separating elements;

Fig. 4, a partial plan of the rear end of the harvester, showing the packing barrels for the potatoes in potato-receiving position;

Fig. 5, a vertical section on the line 5—5, Fig. 3, showing the potato and rock separating levers;

Fig. 6, a partial end view of the potato stream shifter;

Fig. 7, a plan of the same; and

Fig. 8, a side view of some of the elements shown in Fig. 6.

Referring first to Figs. 1, 2, 3, my novel potato harvester comprises a body A, with oppositely positioned side members 1, 2, suitably braced and secured together by any convenient means, as by cross bars 3, and mounted upon any suitable frame, Fig. 1, including the sill 4, angularly positioned supports 5 thereon, and upright supports 6 upon any convenient chassis or running gear, as the wheels 7 and the axle 8.

The body A, at its forward end, Fig. 2, is carried by an upwardly and forwardly extended beam adapted to be secured to any suitable tractor or other vehicle or means (not shown) by which the harvester may be hauled and from which power for operating the harvester may be furnished.

The potatoes dug by an appropriate digger pass to the conveyor on flight 44, Figs. 2, 3, of any suitable type, driven by the chain 47 and sprockets 46, Fig. 2, on shaft 48 in the body members 1, 2, from which the potatoes are deposited upon the conveyor flight loaded shelf or platform 49, Fig. 2, from which they normally slide downwardly, Fig. 3, to the rock and potato separating shelf loaded bars or levers 50, pivotally mounted on a rod 51, Figs. 2, 3, in the side members 1, 2, and held in position by the overhanging shelf 49 and springs 52, Fig. 5, secured to the body members. The bars are near enough together to retain all potatoes of a marketable size and are yieldable vertically against the springs 52 only under the weight of rocks, if any, larger and heavier than the potatoes, and thus leave only the potatoes, which are pushed ahead by the following constant, movable stream of potatoes deposited by the conveyor 44 on the platform 49.

At the end of the bars or levers 50, in the side members 1, 2, is a lever loaded potato elevating roll 53, Fig. 4, and a roll 59 preferably corrugated rubber or the like, or provided with short wings or vanes, and rotated by a chain or drive spring belt, herein the latter, 54, from a pulley 55 on the shaft 48 and which spring first passes under the pulleys 56 and 57 adjacent thereto, Figs. 2, 3.

The spring belt 54, Fig. 1, rotates the pulley 56 from right to left, the pulley 57 and roll 59 driven thereby and loaded by the levers 50 from right to left, and the pulley 58 and roll 53 loaded by the levers 50 from left to right. The above pulleys and lever loaded rolls are operated rapidly by the pulley 55, belt 54 and chain 47, so that the roll 53 rotates with sufficient force to throw the potatoes upwardly over the roll 59 upon a rack like shelf 60, from which the gravel and any grass or weeds fall to the ground and any rocks fall between the rolls 53, 59, and are assisted to go in that direction by the roll 59 rotating from right to left, especially if the rocks fall on the roll 59.

Adjacent the rack 60 on the body A is a potato packing mechanism, which will now be described.

This construction, Figs. 1, 2, 4, 7, 8, includes an upright post 62 suitably supported in the center of the floor of body A, and on the post is a potato stream shifting board 63 of proper height and swingable laterally to the right or left, Fig. 4, used for directing the stream of potatoes to a container, as a barrel or bag on either side of the post, as and when desired, Fig. 4.

At this point the floor of the body A drops downwardly as at 64, Figs. 1, 4, toward the container 65. There is here preferably provided a potato brake or slow-down member 66, as a strip of heavy canvas or the like, fastened to the two opposite side corners 67 of the body A, Figs. 1, 8, and depending across the path of the potato stream to prevent the potatoes from sliding too fast and becoming bruised when they strike the container. While any suitable form of packing means may be used, I have provided a novel, efficient packer or bagging means.

At the rear end of the body, Fig. 6, it is provided on each side with rearwardly extended arms 68—68 pivoted at 69 on their upper ends to the side members 1, 2, of the body and, Figs. 1, 4, 6 having an arm 70 laterally extended each way therefrom, and a seat upwardly extended as at 71 at the outer end of each arm 68 to receive the potato container, as 65, and support it.

Each arm 68 is held normally in extended position, Figs. 1, 4, by a rod 72 with a spring 73 thereon, the rod pivotally mounted on a post 74 on the body support 6, and a post 75 on the arm 68, the spring being seated between the post 74 and a collar 76 adjustable by a set screw 77 on the rod 72 to lock the collar in proper position to maintain sufficient tension in the spring 73 to hold the container in desired inclined position while being filled without bruising the potatoes.

As the barrel is filled, its weight gradually overcomes the resistance of the spring 73 and the barrel drops to an upright position, Fig. 1, dotted lines, from which it may be easily removed. Obviously either one or two barrels or other containers may be provided as desired. If two containers are provided and for automatically shifting the potato stream from the position to fill one container to the position to fill the other, automatic means is provided to be operated by the filled container when it drops down to upright position, to throw a second container into position.

The potato stream shifting mechanism comprises, Figs. 2, 7, a cam race 78 carried by the lower end of the post 62 on the body and beneath the body floor. On a cross support member 79 on the body A there are pivotally mounted, Fig. 7, as by studs 80, a plurality of horizontal arms 81 on the inner ends of which are rolls 82 adapted to travel one on the inside face of each of the two curved faces 83, 84 of the race 78. The outer ends 85 of the arms 81 extend outwardly through the slots 86, Figs. 7, 8, in the body sides 1, 2. Pivotally mounted on each end of the member 79 at the sides of the body A is a two-arm lever 88, Figs. 7, 8, one of the arms 89 of which extends outwardly adjacent the arm 85, while the inner arm 90 in each case drops down and overhangs the short arm 91, Fig. 8, on the upper end of the arm 68 and by which the arms 85 are manipulated. The outer ends of the arms 89 each carry a set screw 92 adjustable therein against the out-turned end 85 of the lever 81.

Normally the stream shifter 63 will be in central position, Fig. 2, and one roll 82 at either side of it, Figs. 2, 7, but below the floor of the body. When the stream shifter is used, the operator will first manually manipulate the shifter to direct the potatoes to the container to be filled first, as in Fig. 4, where the shifter is shown, in dotted lines, in position first to fill the left-hand container, looking from the right, Fig. 1.

When the container is filled and drops to the perpendicular position, dotted lines, Fig. 1, the left-hand arm 68 turns on its pivot 69 and its upper end 91 moves forward slightly, Fig. 8, and strikes the down-turned end 90 of the horizontal finger 88 pivoted at 93 on the board 79, throws the finger 89 rearwardly, causing the inner end of screw 92 thereon to contact the outer end of lever arm 85 to move it forwardly, and the arm 81 with the roll 82 forwardly on the face 83 of the race 78, and thus swing the shifter to the left to cause the potato stream to flow to the right and fill the other barrel or container.

When this container is filled, a like movement of the other arm 68 on its side of the container support produces an opposite movement of the stream shifter. Springs 94, Fig. 7, on and secured to the floor of the body return the cam roll 82 at once to normal position, Fig. 7, to hold its arm 81 with its roll 82 in close contact with the race 83 or 84.

In the manner described the potatoes are freed of the plants, rocks, weeds and small potatoes, and packed as they leave the harvester.

My invention is not limited to the precise construction shown herein, but may be modified in many details, without departing from the spirit of the claim and within the scope thereof.

I claim:

In a stone separating mechanism for a vegetable harvesting machine, the combination of a platform which receives vegetables, said platform being inclined downwardly, a set of spaced levers which receive vegetables and stones from said platform, said levers being inclined downwardly from and constituting in effect a prolongation of said platform in the direction of travel of the vegetables under the influence of gravity, said levers being separately fulcrumed to rock independently in vertical, parallel planes from their normal, downwardly inclined arrangement to a greater inclination under the influence of stones relatively heavier than the vegetables, yielding means to restore said levers to their normal inclination, a vegetable forwarding roller which receives vegetables and remaining stones from said levers, said roller rotating in a direction to continue the travel of the vegetables, and a stone rejecting roller which rotates in a reverse direction and is separated from said forwarding roller by a space through which remaining stones pass.

EDWARD S. GORTON.